United States Patent
Trim et al.

(10) Patent No.: US 10,642,317 B2
(45) Date of Patent: May 5, 2020

(54) CLASP WITH INTEGRATED BIOMETRIC SENSOR TO AUTHENTICATE A USER OF A DUAL-HOUSING DEVICE

(71) Applicant: Dell Products L. P., Round Rock, TX (US)

(72) Inventors: James Damon Trim, Pflugerville, TX (US); Jace W. Files, Round Rock, TX (US); John Trevor Morrison, Round Rock, TX (US); Michiel S. Knoppert, Amsterdam (NL)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 15/878,975

(22) Filed: Jan. 24, 2018

(65) Prior Publication Data
US 2019/0227602 A1 Jul. 25, 2019

(51) Int. Cl.
*H04L 29/06* (2006.01)
*G06F 1/16* (2006.01)
(Continued)

(52) U.S. Cl.
CPC .......... *G06F 1/1679* (2013.01); *G06F 1/1601* (2013.01); *G06F 1/1618* (2013.01); *G06F 1/1647* (2013.01); *G06F 1/1656* (2013.01); *G06F 1/1677* (2013.01); *G06F 1/1681* (2013.01); *G06F 1/1683* (2013.01); *G06F 1/1684* (2013.01); *G06F 3/044* (2013.01); *G06F 9/4406* (2013.01); *G06F 21/32* (2013.01);
(Continued)

(58) Field of Classification Search
CPC .................................................... G06F 1/1679
See application file for complete search history.

(56) References Cited

U.S. PATENT DOCUMENTS 5,570,688 A * 11/1996 Cochran ................ A62B 9/006
128/201.27
7,809,412 B2 * 10/2010 Carlson ................ G06F 1/1616
379/433.13
(Continued)

FOREIGN PATENT DOCUMENTS

WO WO-2017177386 A1 * 10/2017 ............... G06K 9/00

OTHER PUBLICATIONS

Li Wenbo, CN-205038451-U, Feb. 2016 (Year: 2016).*

*Primary Examiner* — Shawnchoy Rahman
(74) *Attorney, Agent, or Firm* — Campbell Stephenson LLP; Shiv S. Naimpally

(57) ABSTRACT

In some examples, a computing device may include a first housing mechanically coupled to a second housing. The coupling may enable the first housing to be placed at an angle of between at least 0 to 180 degrees relative to the second housing. A clasp may be used to temporarily hold the first housing against the second housing when the first housing is placed at an angle of about 0 degrees relative to the second housing. A clasp sensor may determine that a user touched the clasp. In response, the computing device may initiate a boot process of an operating system. The boot process may capture biometric data using a biometric sensor in the clasp and compare the biometric data with previously stored biometric data associated with the user. The boot process may authenticate the user when the biometric data matches the previously stored biometric data.

20 Claims, 8 Drawing Sheets

(51) Int. Cl.
  *G06F 21/32*   (2013.01)
  *G06F 3/044*   (2006.01)
  *G06F 9/4401*  (2018.01)
  *G06K 9/00*    (2006.01)

(52) U.S. Cl.
  CPC ..... *G06K 9/00013* (2013.01); *G06K 9/00228* (2013.01); *G06K 9/00604* (2013.01)

(56) References Cited

U.S. PATENT DOCUMENTS

| | | | | |
|---|---|---|---|---|
| 9,992,883 B2* | 6/2018 | Peek | ........................ | G02B 6/42 |
| 2005/0054395 A1* | 3/2005 | Arbisi | ................... | H04M 1/022 |
| | | | | 455/575.3 |
| 2006/0132382 A1* | 6/2006 | Jannard | ................. | G02C 11/06 |
| | | | | 345/8 |
| 2009/0111286 A1* | 4/2009 | Giovannoni | ......... | G06K 19/077 |
| | | | | 439/37 |
| 2013/0054986 A1* | 2/2013 | Kim | ....................... | G06F 1/3234 |
| | | | | 713/300 |
| 2013/0176672 A1* | 7/2013 | Richard | ................. | F16M 11/10 |
| | | | | 361/679.22 |
| 2014/0283142 A1* | 9/2014 | Shepherd | .............. | G06F 3/0482 |
| | | | | 726/30 |
| 2015/0029660 A1* | 1/2015 | Huang | ................... | H05K 1/189 |
| | | | | 361/679.54 |
| 2015/0286813 A1* | 10/2015 | Jakobsson | ........... | H04W 12/003 |
| | | | | 726/9 |
| 2016/0050217 A1* | 2/2016 | Mare | ...................... | H04L 9/3215 |
| | | | | 726/4 |
| 2016/0323966 A1* | 11/2016 | Hamel | ................... | H05B 33/26 |
| 2017/0010771 A1* | 1/2017 | Bernstein | ................ | G06F 1/165 |
| 2017/0013188 A1* | 1/2017 | Kothari | ............... | B60R 11/0235 |
| 2018/0211023 A1* | 7/2018 | Ronnow | ................. | G06F 1/163 |

* cited by examiner

CLASP WITH INTEGRATED BIOMETRIC SENSOR TO AUTHENTICATE A USER OF A DUAL-HOUSING DEVICE

BACKGROUND OF THE INVENTION

Field of the Invention

This invention relates generally to computing devices and, more particularly, to a computing device with two (or more) housings that uses a clasp with an integrated biometric sensor (e.g., a fingerprint reader, a facial recognition sensor, a retinal scanner, or the like) to authenticate the user.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system, such as computing device (e.g., laptop or tablet) may use two housings (e.g., a first housing for a display device and a second housing for a motherboard). The two housings may be attached by one or more hinges (or other similar mechanism) to enable the computing device to be folded to transport the computing device and to protect the display device from damage. In some cases, a clasp may be used to secure the two housings when the computing device is folded.

Using a clasp to secure two housings of a portable computing device may add to the delay in placing the computing device in an operational state. For example, to place the computing device in an operational state, the user may (i) unclasp the clasp by moving the clasp from a closed position (e.g., temporarily locking the two housings together) to an open position (e.g., unlocking the two housings to enable them to be placed at an angle greater than zero relative to one another) to release the two housings, (ii) move the two housing apart, (iii) select a power button to power on the computing device (e.g., from a low-power or power-off state), (iv) wait for the operating system to boot, and (v) authenticate the user by providing authentication information (e.g., username and password). Thus, using a clasp to hold the two housings together may add to the delay from when the user opens the clasp to when the computing device is in an operational state, thus providing the user with a negative experience.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include a first housing mechanically coupled to a second housing. The mechanical coupling (e.g., hinges) may enable the first housing to be placed at an angle of between at least 0 to 180 degrees relative to the second housing. A clasp may be used to temporarily hold the first housing against the second housing when the first housing is placed at an angle of about 0 degrees relative to the second housing, e.g., in a manner that protects a display device in one or both housings from external elements. The clasp may include a clasp sensor and a biometric sensor. The clasp sensor may be (i) a capacitive touch sensor that senses when a user has touched the clasp for at least a predetermined amount of time or (ii) a sensor that senses when the clasp has been unclasped, such as a Hall-Effect sensor, a Reed switch, or the like. When a user touches the capacitive touch sensor for at least a predetermined amount of time or when the clasp sensor senses that the clasp has been unclasped, the computing device may initiate a boot process of an operating system of the computing device. The boot process may capture biometric data using the biometric sensor and compare the biometric data with previously stored biometric data associated with the user. The boot process may authenticate the user when the biometric data matches the previously stored biometric data. In some cases, a cover may be used to cover and protect the external surfaces of the two housings. The cover may connect to the clasp and may include a graphene layer to provide thermal cooling.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
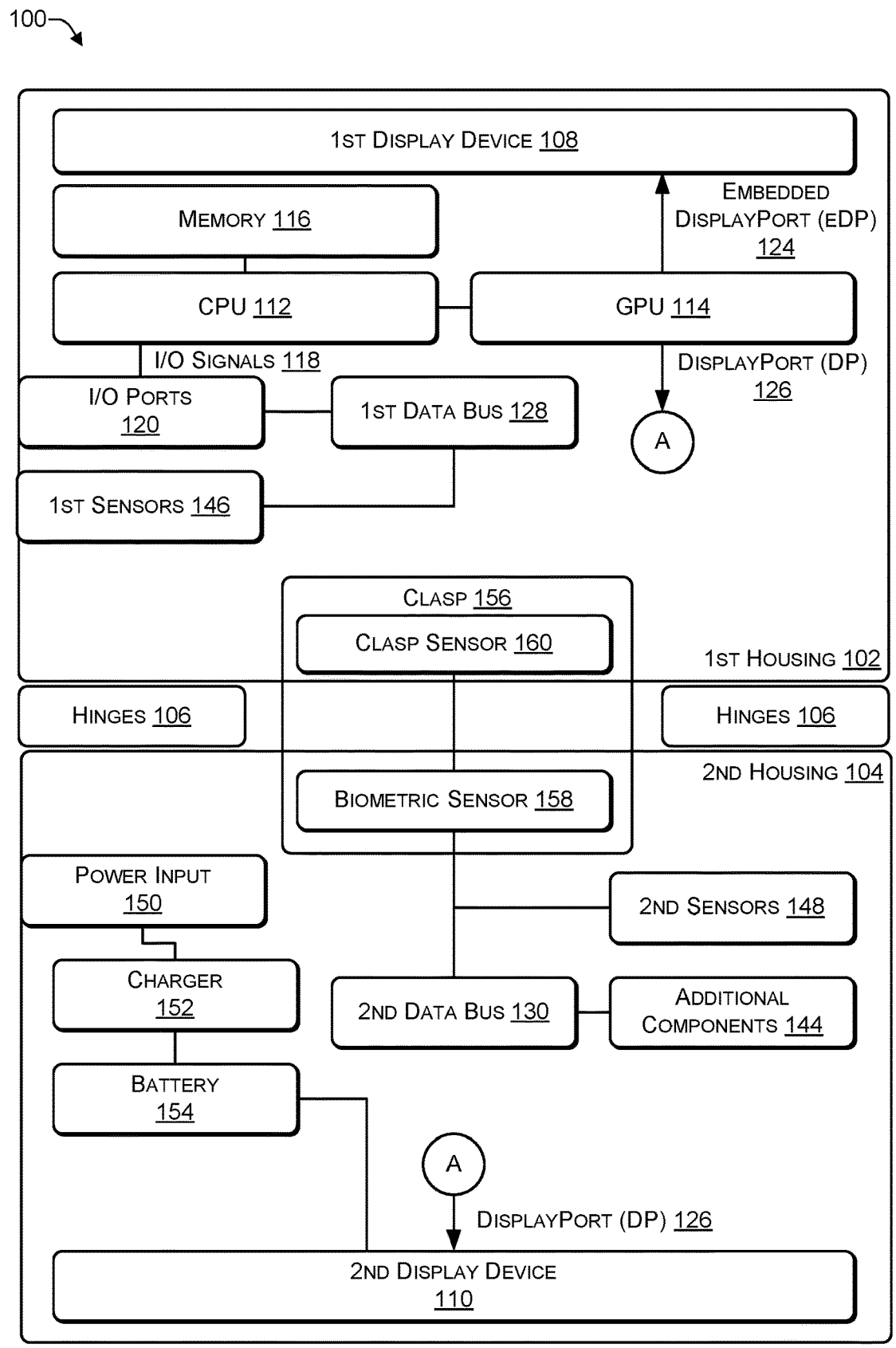
FIG. 1 is a block diagram of an architecture of a computing device with two housings according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use a clasp with an embedded biometric sensor (e.g., fingerprint reader, retinal scanner, facial recognition sensor, or the like) to authenticate a user of a computing device. The clasp may be physically used to secure two housings of a computing device (e.g., laptop, dual-display tablet, or the like). In addition to a biometric sensor, the clasp may include a clasp sensor. The clasp sensor may be (i) a capacitive touch sensor that senses when a user has touched the clasp (e.g., for at least a predetermined amount of time) or (ii) a sensor that senses when the clasp has been unclasped (e.g., moved from a closed/locked position to an open/unlocked position), such as a Hall-Effect sensor, a Reed switch, or the like. When the clasp sensor (e.g., capacitive touch sensor, Hall-Effect sensor, or Reed switch) detects that (1) a user is touching (or has touched) the clasp for the predetermined amount of time or (2) the clasp sensor determines that the clasp has been opened/unlocked (e.g., moved from a closed position to an open position), the computing device may initiate a boot process of an operating system of the computing device. The boot process may include an authentication module that uses the biometric sensor embedded in the clasp to gather biometric data and compare the biometric data with stored biometric data associated with authorized users to authenticate the user.

For example, the boot process may authenticate the user by scanning a fingerprint of a pad of a finger that is being pressed against the biometric sensor (e.g., fingerprint scanner) and comparing the fingerprint with previously stored fingerprints of one or more authorized users of the computing device. If the fingerprint matches one of the previously stored fingerprints, then the boot process may continue until the operating system has booted and the computing device has been placed in an operational state. As another example, the boot process may authenticate the user by scanning a retina of the user as the user gazes at the biometric sensor (e.g., retinal scanner) and comparing the retinal scan with previously stored retinal scans of one or more authorized users of the computing device. If the retinal scan matches one of the previously stored retinal scans, then the boot process may continue until the operating system has booted and the computing device has been placed in an operational state. As yet another example, the boot process may authenticate the user by capturing an image of the user's face as the user faces the biometric sensor (e.g., an imaging sensor, such as a camera) and performing facial recognition by comparing the scanned facial features with previously stored facials scans of one or more authorized users of the computing device. If the scan of the user's face matches one of the previously stored facial scans, then the boot process may continue until the operating system has booted and the computing device has been placed in an operational state. Of course, other biometric sensors may be used in a similar manner. While the computing device is booting, the user may open the two housings of the computing device, place the computing device in a particular orientation, locate an active stylus used to provide input, and prepare to use the computing device.

If the biometric data obtained by the biometric sensor does not match the previously obtained biometric data, then the authentication process may not proceed further. For example, if the biometric data does not allow the user to be authenticated, the user may be given an option to (1) provide the same biometric data (e.g., fingerprint, retinal scan, facial characteristics, or the like) to be obtained again, (2) provide different biometric data, or (3) provide a username and password (or another type of authentication information). For example, a single biometric sensor, such as an image capture device (e.g., a camera) may be used to either capture a fingerprint, perform a retinal scan, or scan a face for facial recognition. The user may specify which biometric measurement the user desires to use for authentication.

The systems and techniques described herein use a clasp with an embedded biometric sensor (e.g., fingerprint reader, retinal scanner, facial recognition sensor, or the like) to authenticate a user of a computing device. The clasp may be physically used to secure two housings of a computing device (e.g., laptop, dual-display tablet, or the like). In addition to a biometric sensor, the clasp may include a clasp sensor, such as, for example, a Hall-Effect sensor, a Reed switch, or a capacitive touch sensor. When the clasp sensor detects that clasp has been placed in an open/unlocked position or the capacitive touch sensor detects that a user is touching (or has touched) the clasp for at least a predetermined period of time, the computing device may initiate a boot process of an operating system of the computing device. The boot process may include an authentication module that is used to authenticate the user. The boot process may use the biometric sensor embedded in the clasp to authenticate the user.

For example, the boot process may authenticate the user by scanning a fingerprint of a pad of a finger that is being pressed against the biometric sensor (e.g., fingerprint scanner) and comparing the fingerprint with previously stored fingerprints of one or more authorized users of the computing device. If the fingerprint matches one of the previously stored fingerprints, then the boot process may continue until the operating system has booted and the computing device has been placed in an operational state. As another example, the boot process may authenticate the user by scanning a retina of the user as the user gazes at the biometric sensor (e.g., retinal scanner) and comparing the retinal scan with previously stored retinal scans of one or more authorized users of the computing device. If the retinal scan matches one of the previously stored retinal scans, then the boot process may continue until the operating system has booted and the computing device has been placed in an operational state. As yet another example, the boot process may authenticate the user by capturing an image of the user's face as the user faces the biometric sensor (e.g., an imaging sensor, such as a camera) and performing facial recognition by comparing the scanned facial features with previously stored facials scans of one or more authorized users of the computing device. If the scan of the user's face matches one of the previously stored facial scans, then the boot process may continue until the operating system has booted and the computing device has been placed in an operational state. Of course, other biometric sensors may be used in a similar manner. While the computing device is booting, the user may open the two housings of the computing device, place the computing device in a particular orientation, locate an active stylus used to provide input, and prepare to use the computing device.

For example, a computing device may include a first housing mechanically coupled to a second housing by one or more hinges (or other mechanical coupling mechanism). The first housing may include a display device. The second housing may include one or more processors and a memory (e.g., computer-readable storage media). In some cases, the second housing may include a second display device. The one or more hinges may enable the first housing to be placed at an angle relative to the second housing. The computing device may include a clasp to temporarily hold the first housing and the second housing when the first housing is placed at an angle of about 0 degrees relative to the second housing. For example, when the first housing is placed at an angle of about 0 degrees relative to the second housing, the display device(s) may face inward, enabling the computing device to be transported while protecting the display device(s). The clasp may include a biometric sensor and a clasp sensor (e.g., a Hall-Effect sensor, a Reed switch, or a capacitive touch sensor). For example, the biometric sensor may be a fingerprint reader, a retinal scanner, an imaging sensor used to perform facial recognition, another type of biometric sensor, or any combination thereof. In some cases, a single imaging sensor may be capable of capturing fingerprint data, retinal scan data, and facial recognition-related data. The one or more non-transitory storage media may store instructions executable by the one or more processors to perform various operations. For example, the operations may include receiving clasp data from the clasp sensor (e.g., indicating that either (i) a user has touched the capacitive touch sensor for at least a predetermined amount of time or (ii) the user moved the clasp from a closed/locked position to an open/unlocked position). The operations may include initiating (e.g., in response to the user touching the clasp sensor) a boot process of an operating system of the computing device, and authenticating the user using the biometric sensor. For example, the operations may authenticate the user by capturing biometric data using the biometric sensor, determining whether the biometric data matches previously stored biometric data associated with one or more authorized users of the computing device. The user may be authenticated when the biometric data matches the previously stored biometric data. If the biometric data does not match the previously stored biometric data, then the operations may include capturing additional biometric data using the biometric sensor, determining whether the additional biometric data matches the previously stored biometric data, and authenticating the user when the biometric data matches the previously stored biometric data. In some cases, a cover may be attached to an external surface of the first housing and the second housing. The cover may include the clasp, a graphene layer, and a routing layer. The graphene layer may be used to dissipate heat generated by the components in the first housing, in the second housing, or both. The routing layer may be used to route cables to the biometric sensor and to the clasp sensor. For example, power cables may be routed using the routing layer to provide power to the biometric sensor and to the clasp sensor. Data cables may be routed using the routing layer to receive clasp data from the clasp sensor (e.g., capacitive touch sensor, Hall-Effect sensor, or Reed switch). The data cables may be used to instruct the biometric sensor to capture the biometric data and to send the biometric data from the biometric sensor to the one or more processors of the computing device.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 102 coupled to a second housing 104 via one or more hinges 106. The hinges 106 may enable the two housings 102, 104 to be positioned at different angles relative to each other in different orientations (e.g., various vertical orientations and various horizontal orientations). Of course, additional housings may be attached via additional hinges to create a computing device with multiple housings. In a single housing computing device, the hinges 106 may be absent and the components of the computing device 100 may be located in a single housing (e.g., the first housing 102).

A first display device 108 may be located in the first housing 102 and, in some cases (e.g., in a dual-display device), a second display device 110 may be located in the second housing 104. A first portion of the components of the computing device 100 may be located in the first housing 102 (e.g., behind the first display device 108) while a remaining portion of the components of the computing device 100 may be located in the second housing 104 (e.g., behind the second display device 110). For example, as illustrated in FIG. 1, the components located in the first housing 102 may include at least one central processing unit (CPU) 112, a graphics process unit (GPU) 114, and a memory (e.g., computer-readable media) 116. The GPU 114 may be integrated into the CPU 112 or may be a separate device from the GPU 114. In some cases, a computer motherboard that includes the CPU 112, the memory 116, and the like may be located in the first housing 102.

The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 102 and two or more lanes of DisplayPort (DP) output 126 that are sent (e.g., wirelessly or via a cable) to the second display device 110 in the second housing 104.

A first data bus 128 in the first housing 102 and a second data bus 130 in the second housing 104 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 104 may include a remaining portion of the components of the computing device 100. In some cases, the components in the second housing 104 may be located behind the second display device 110. In a single housing computing device, the second display device 110 may not be present. The second housing 104 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 102 with the components of the computing device 100 located in the second housing 104. In other cases, a first wireless transceiver in the first housing 102 and a second wireless transceiver in the second housing 104 may provide wireless communications between (1) the components of the computing device 100 located in the first housing 102 and (2) the components of the computing device 100 located in the second housing 104. The first set of sensors 146 and the second sensors 152 may include one or more of a touch-screen sensor, an accelerometer, a gyroscope, an electronic compass (e-compass), a barometer, a magnetometer, a proximity sensor, a light sensor, an imaging sensor (e.g., a camera), a fingerprint sensor, a global positioning satellite (GPS) sensor, another type of sensor, or any combination thereof.

A clasp 156 may include a biometric sensor 158 (e.g., a fingerprint reader, a retinal scanner, a facial recognition device, or the like) and a clasp sensor 160 (e.g., capacitive touch sensor, Hall-Effect sensor, or Reed switch). At least a portion of the clasp 156 may be made of metal (or a metal alloy). During bootup, the biometric sensor 158 may be used to perform a biometric measurement of a user to create biometric data. The biometric data may be compared with stored biometric data that is associated with one or more authorized users. If the biometric data matches (e.g., within a predetermined tolerance) the stored biometric data, then the user may be authenticated and the computing device 100 may bootup. If the biometric data does not match (e.g., is not within a predetermined tolerance) the stored biometric data, then the computing device 100 may bootup but may not allow the user to access the computing device 100 until the user has been authenticated. For example, if the biometric data does not match, the user may be given an option to (1) provide the same biometric data (again), (2) provide a different type of biometric data (e.g., request that the computing device authenticate the user using a retinal scan rather than a fingerprint scan), or (3) provide a username and password or other non-biometric authentication.

In FIG. 1, the first set of components of the computing device 100 shown as being located in the first housing 102 and the remaining set of components shown as located in the second housing 104 are purely for illustration purposes. Depending on the implementation, different components of the computing device 100 may be housed in one or both of the housings 102, 104. For example, when the computing device 100 is designed for graphics processing, the GPU 114 and supporting hardware (e.g., graphics support chips, graphics memory, and the like) may be housed in the second housing 104. As another example, in some cases, the ports 120 may be located in the first housing 102, in the second housing 104, or split between the two housings 102, 104. As a further example, the battery 154 may include multiple power cells, with a portion of the power cells located in the first housing 102 and zero or more of the power cells located in the second housing 104. In some cases, which components of the computing device 100 are located in each of the housings 102, 104 may be determined based on the thermal characteristics of the components. For example, the components may be distributed between the housings 102, 104 by grouping components that generate the most heat into the same housing, and using a cover (e.g., see, for example, FIG. 5) to cool that housing. In addition, while the computing device 100 is illustrated as having two display devices 108, 110, in some cases the computing device 100 may have a single display device, e.g., when the computing device 100 is configured as a tablet (e.g., all components in a single housing) or a laptop computing device (e.g., with a display in the first housing and input devices, such as a keyboard and touchpad, in the second housing).

Software instructions implementing an operating system and one or more applications, including at least one application capable of receiving stylus input, may be stored in the memory 116. The software instructions may be executed by the CPU 112, by the DSP processor 122, or any combination thereof.

Thus, the clasp 156 may include the biometric sensor 158 (e.g., fingerprint reader, retinal scanner, facial recognition sensor, or the like) to authenticate a user of the computing device 100. The clasp 156 may be physically used to secure the two housings 102, 104 of the computing device 100. In addition to the biometric sensor 158, the clasp 156 may include the clasp sensor 160 (e.g., capacitive touch sensor, Hall-Effect sensor, Reed switch, or the like). When the clasp sensor 160 detects that a user is touching the clasp 156, the computing device 100 may initiate a boot process of an operating system stored in the memory 116. The boot process may include an authentication module that is used to authenticate the user. The boot process may use the biometric sensor 158 embedded in the clasp to authenticate the user.

For example, the boot process may authenticate the user by scanning a fingerprint of a pad of a finger that is being pressed against the biometric sensor 158 (e.g., fingerprint scanner) and comparing the fingerprint with previously stored fingerprints of one or more authorized users of the computing device 100. If the fingerprint matches one of the previously stored fingerprints, then the boot process may continue until the operating system has booted and the computing device 100 has been placed in an operational state. As another example, the boot process may authenticate the user by scanning a retina of the user as the user gazes at the biometric sensor 158 (e.g., retinal scanner) and comparing the retinal scan with previously stored retinal scans of one or more authorized users of the computing device 100. If the retinal scan matches one of the previously stored retinal scans, then the boot process may continue until the operating system has booted and the computing device 100 has been placed in an operational state. As yet another example, the boot process may authenticate the user by capturing an image of the user's face as the user faces the biometric sensor 158 (e.g., an imaging sensor, such as a camera) and performing facial recognition by comparing the scanned facial features with previously stored facials scans of one or more authorized users of the computing device 100. If the scan of the user's face matches one of the previously stored facial scans, then the boot process may continue until the operating system has booted and the computing device 100 has been placed in an operational state. Of course, other biometric sensors may be used in a similar manner. While the computing device 100 is booting, the user may open the two housings 102, 104 of the computing device 100, place the computing device 100 in a particular orientation, activate an active stylus used to provide input, and prepare to use the computing device 100.

Figure 2:
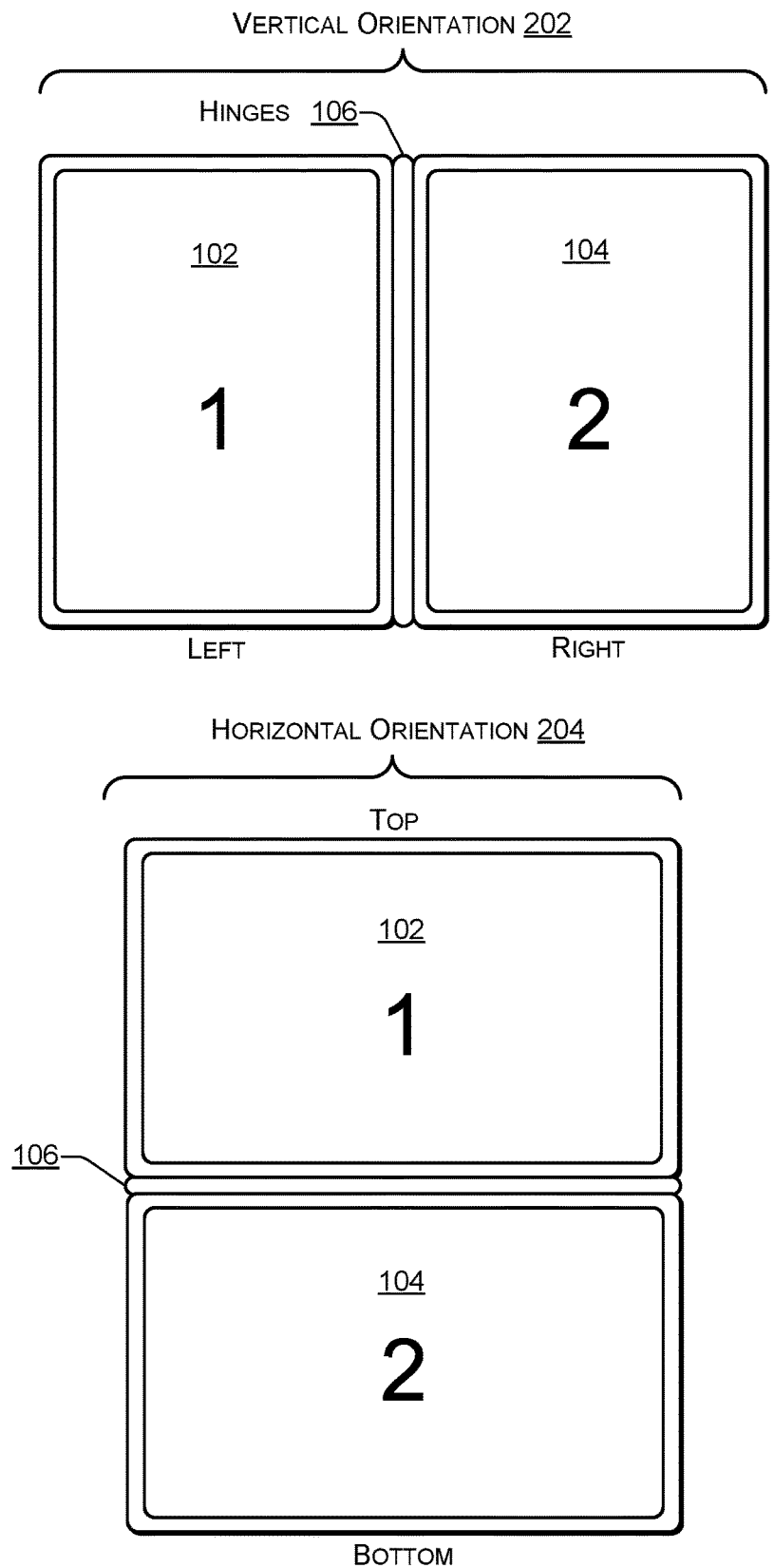
FIG. 2 is a block diagram illustrating different orientations of a dual-housing computing device according to some embodiments.

FIG. 2 is a block diagram illustrating different orientations of a dual-housing computing device (e.g., the computing device 100 of FIG. 1) according to some embodiments. The computing device 100 may include two housings 102, 104. One or both of the housings 102, 104 may include a display device. In some cases, one of the housings 102, 104 may include a display device and the other housing may include one or more input devices, such as a keyboard, trackpad, and the like.

Figure 3:
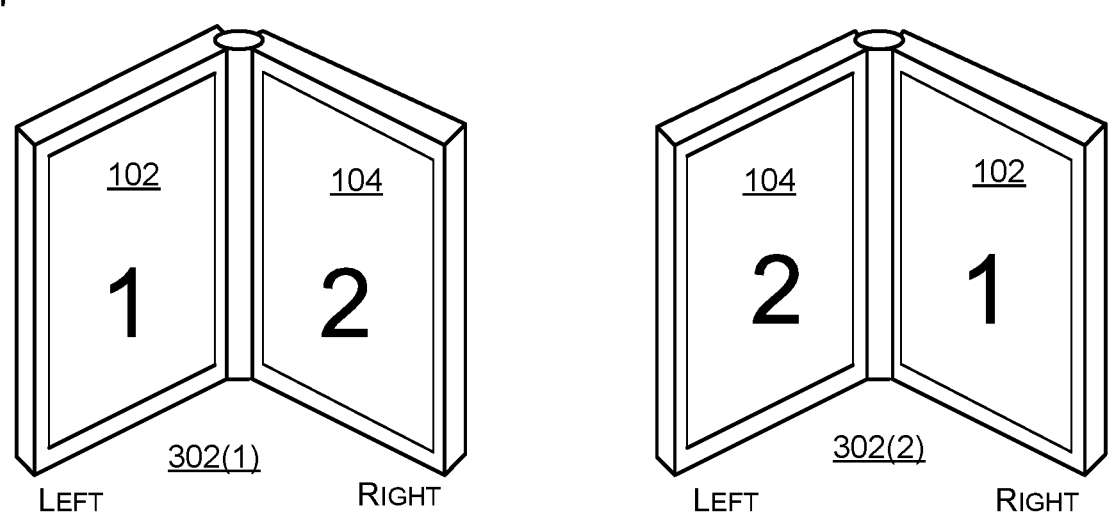
FIG. 3 is a block diagram illustrating different vertical orientations of a dual-housing computing device according to some embodiments.
Figure 3:
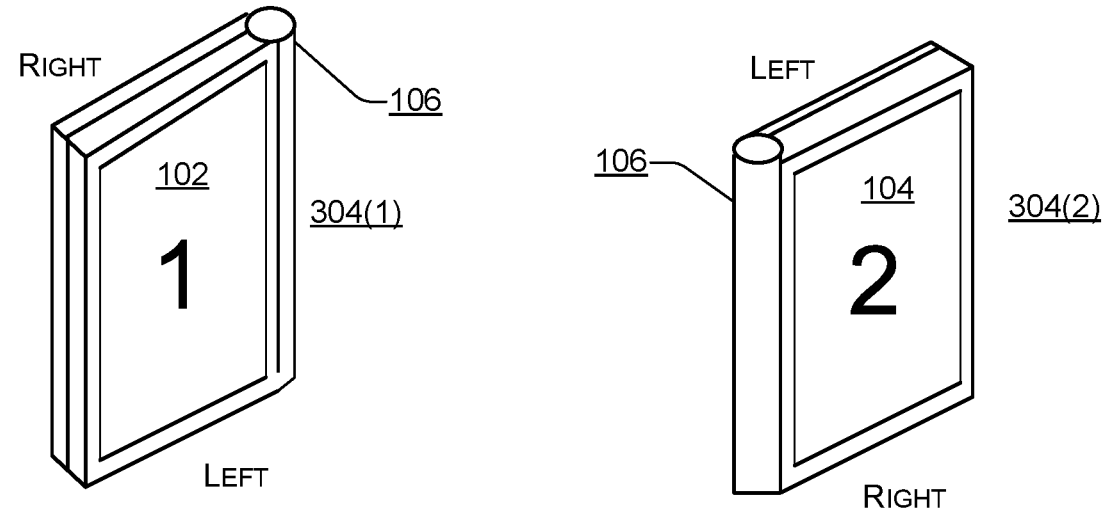

The computing device 100 may be displayed in a vertical (e.g., portrait) orientation 202 or a horizontal (e.g., landscape) orientation 204. For example, in the vertical orientation 202, the first housing 102 may be on one side (e.g., the left side or the right side), the second housing 104 may be on another side (e.g., the right side or the left side), and the hinge 106 may join the first housing 102 to the second housing 104. Additional examples of the vertical orientation 202 are illustrated in FIG. 3. In the horizontal orientation 204, the first housing 102 may be located at the top (or the bottom) of the computing device 100 with the hinge 106 in the middle and the second housing 104 may be located at the bottom (or the top) of the computing device 100. Additional examples of the horizontal orientation 204 are illustrated in FIG. 4.

FIG. 3 is a block diagram illustrating different vertical orientations of a dual-housing computing device according to some embodiments. Additional examples of the vertical orientation 202 may include a book orientation 302 and a vertical tablet orientation 304. For example, in a first book orientation 302(1), the first housing 102 may be on the left and the second housing 104 may be on the right. Alternately, in a second book orientation 302(2), the second housing 104 may be on the left and the first housing 102 may be on the right.

In the vertical tablet orientation 304, the first housing 102 may be on the left and the second housing 104 may be on the right. In a first vertical tablet orientation 304(1), the first housing 102 may be facing a user and the second housing 104 may be rotated approximately 360 degrees to face away from the user. In a second vertical tablet orientation 304(2), the second housing 104 may be facing the user while the first housing 102 may rotated approximately 360 degrees to face away from the user.

Figure 4:
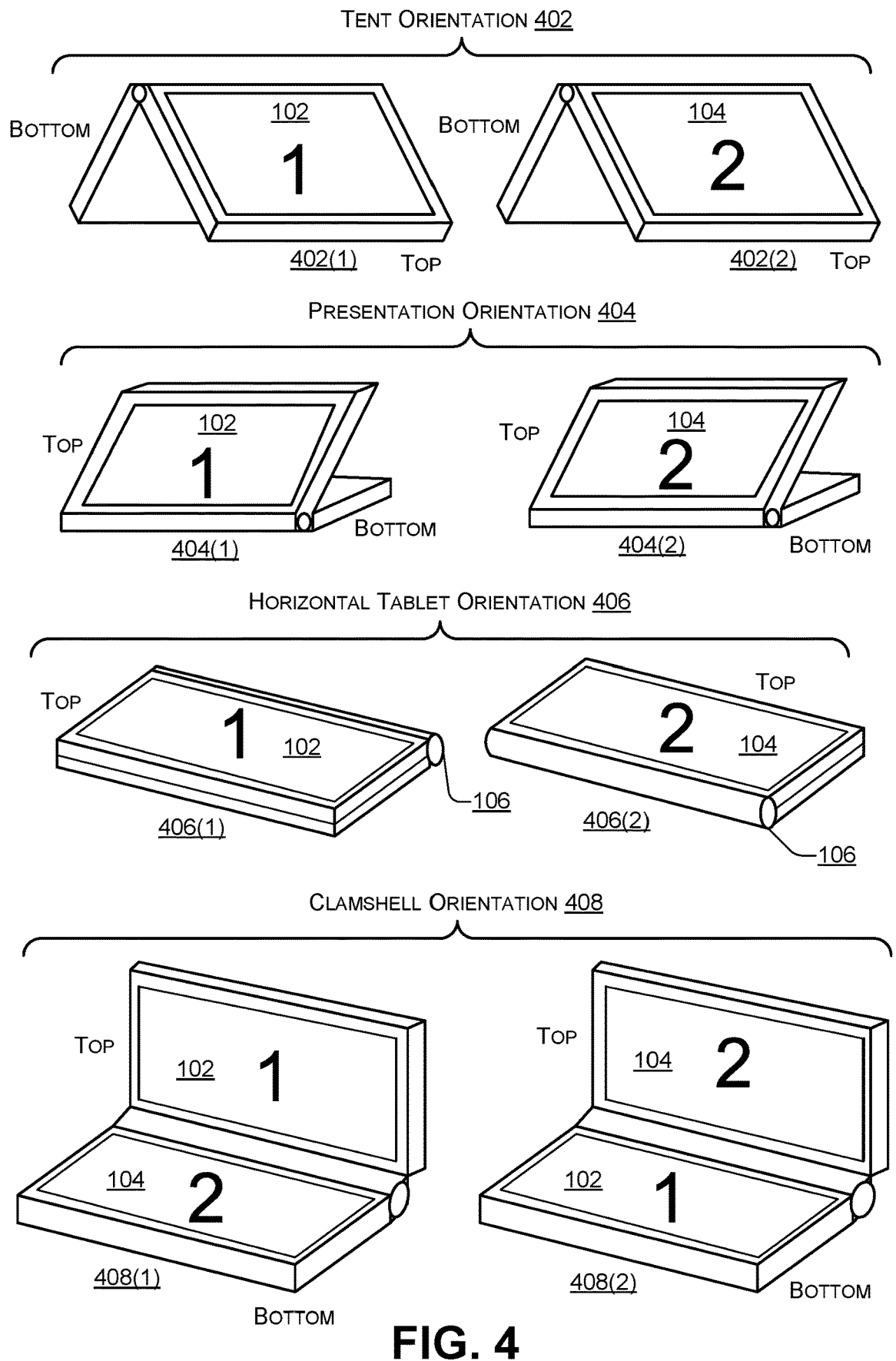
FIG. 4 is a block diagram illustrating different horizontal orientations of a dual-housing computing device according to some embodiments.

FIG. 4 is a block diagram illustrating different horizontal orientations of a dual-housing computing device according to some embodiments. Additional examples of the horizontal orientation 204 may include a tent orientation 402, a presentation orientation 404, a horizontal tablet orientation 406, and a clamshell orientation 408.

In 402(1), the first housing 102 may be at the top facing the user while the second housing 104 may be at the bottom facing away from the user. In 402(2), the second housing 104 may be at the top facing the user and the first housing 102 may be at the bottom facing away from the user.

In 404(1), the first housing 102 may be at the top facing the user and the second housing 104 may be at the bottom facing down. In 404(2) the second housing 104 may be at the top facing the user and the first housing 102 may be at the bottom facing down.

In 406(1), the first housing 102 may be at the top facing the user and the second housing 104 may be at the bottom facing down (e.g., away from the user). In 406(2), the second housing 104 may be at the top facing the user and the first housing 102 may be at the bottom facing down (e.g., away from the user).

In 408(1), the first housing 102 may be at the top facing the user and the second housing 104 may be at the bottom facing the user (e.g., in a position where traditionally, a keyboard is located in a laptop). In 408(1), in some cases, a QWERTY-based keyboard may be displayed on the second housing 104 and used to receive keyboard input. In 408(2), the second housing 104 may be at the top facing the user and the first housing 102 may be at the bottom facing the user (e.g., in a position where traditionally, a keyboard is located in a laptop). In 408(2), in some cases, a QWERTY-based keyboard may be displayed on the first housing 102 and used to receive keyboard input.

Figure 5:
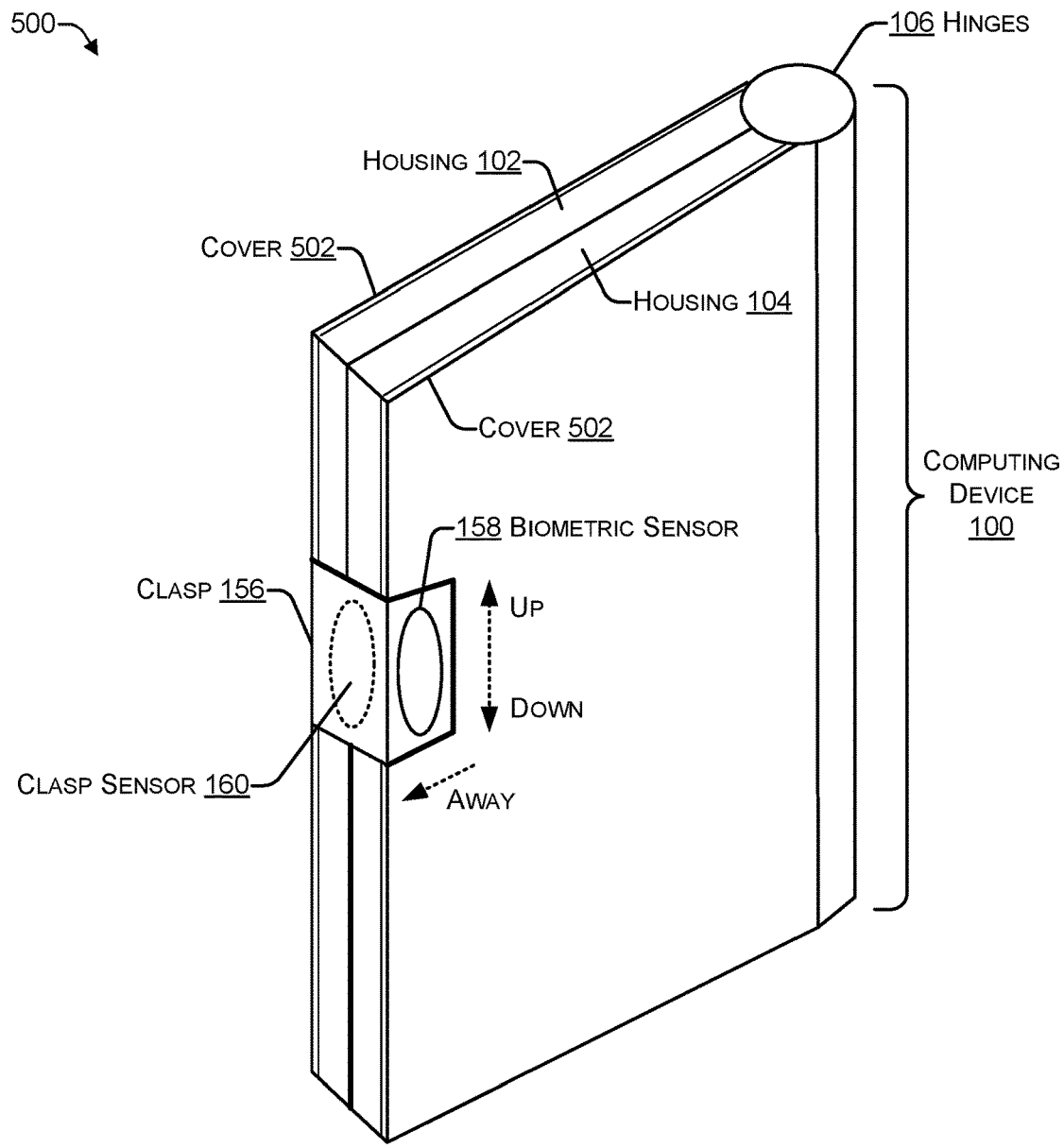
FIG. 5 is a block diagram illustrating a computing device that includes a clasp with an integrated biometric sensor according to some embodiments.
Figure 5:
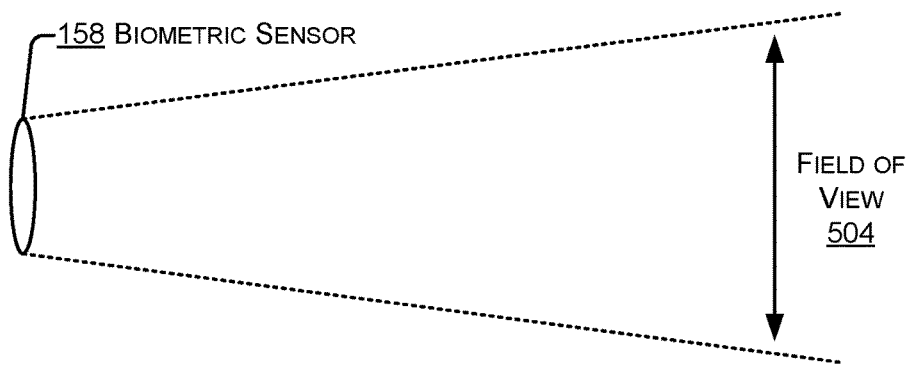

FIG. 5 is a block diagram 500 illustrating a computing device that includes a clasp with an integrated biometric sensor according to some embodiments. In FIG. 5, the display surfaces of the display devices 108, 110 may be facing each other to protect the display surfaces from damage when the computing device 100 is being transported. The clasp 156 may be used to physically secure the first housing 102 to the second housing 104.

The clasp 156 may include the biometric sensor 15, such as, for example, a fingerprint reader, a retinal scanner, an image sensor for facial recognition, or another type of biometric sensor. The biometric sensor 158 may be capable of measuring a human characteristic, such as, for example, a fingerprint (or thumbprint), a retina, one or more facial characteristics, or the like to create biometric data that can be compared with previously obtained biometric data to authenticate a user. In some cases, the biometric sensor 158 may be an image capture sensor that may be used to capture at least one of a fingerprint, a retinal scan, or a facial image. The user may specify in a user profile which type of biometric authentication the computing device 100 performs. When the biometric scanner 158 is used as a fingerprint reader, the user may press a pad of a particular finger (or thumb) against the biometric sensor 158 for a predetermined period of time (Q milliseconds, where Q>0) to enable the biometric sensor 158 to capture (e.g., obtain) an accurate scan of the fingerprint. When the biometric sensor 158 is used as a retinal scanner, the user may place a particular one of the user's eyes in a field of view 504 of the biometric sensor 158 to enable the biometric sensor 158 to capture (e.g., obtain) an accurate scan of the user's retina. When the biometric sensor 158 is used to perform facial recognition, the user may place the user's face in the field of view 504 of the biometric sensor 158 to enable the biometric sensor 158 to accurately capture (e.g., obtain) features of the user's face.

The clasp 156 may include a clasp sensor 160 (e.g., capacitive touch sensor, Hall-Effect sensor, or Reed switch). For example, to conserve power when not in use, the computing device 100 may be placed in a low-power state (e.g., hibernation or similar state). When the clasp sensor 160 detects that the user has touched (or is touching) the clasp (e.g., when a capacitive touch sensor is used) or is placing the clasp in an open/unlocked position (e.g., when a Hall-Effect sensor or Reed switch is used), a BIOS of the computing device 100 may wake up the computing device 100 by changing the state from the low-power state to an authentication state in which power is provided to the biometric sensor 158 to capture biometric data and to compare the biometric data with previously captured biometric data of one or more authorized users to authenticate the user.

The clasp 156 may be designed to be opened in any number of ways. For example, a user may open the clasp 156 by moving the clasp 156 in a particular direction, such as up, down, or away. As another example, a user may open the clasp 156 by moving the clasp 156 in a first direction (e.g., up or down) and then in a second direction (e.g., away).

The computing device may include an external cover 502 to which the clasp 156 is attached. The external cover 502 may include one or more layers of thermally conductive materials, such as graphite, copper, aluminum, another type of material, or any combination thereof. In some cases, such as when the computing device 100 includes the first housing 102 connected to the second housing 104 by the one or more hinges 106, the cover 502 may include three portions, e.g., a first portion covering the first housing 102, a second portion covering the second housing, and a third portion that thermally connects the first portion to the second portion. The third portion of the cover 503 may be sufficient flexible to enable the first housing 102 to be placed at an angle (e.g., preferably between about 0 to about 180 degrees or between about 0 to about 360 degrees) relative to the second housing 104. The third portion of the cover may be capable of thermally conducting heat from a warmer housing to a cooler housing while the first housing 102 is placed at an angle relative to the second housing 104. In addition, the third portion of the cover 502 may be designed to be repeatedly flexed (e.g., articulated) without breaking (or other damage) for an expected life of the computing device 100. In some cases, the third portion of the cover 502 may be placed inside the one or more hinges that are used to couple the first housing 102 to the second housing 104 of the computing device 100. For example, by having the cover 502 include graphene, a flexible material, the cover 502 can be used for both housings 102, 104 by threading the cover 502 through hollowed out hinges 106.

By using the cover 502, the temperature difference between two housings 102, 104 of the computing device 100 may be reduced to less than a pre-determined threshold (e.g., preferably less than 6 degrees Fahrenheit and more preferably less than 4 degrees Fahrenheit). For example, the temperature difference between two different housing 102, 104 may be reduced to a level that does not cause users to become concerned. Furthermore, because the cover 502 spans both housings 102, 104, the cover 502 may distribute the thermal load across both housings 102, 104. By improving thermal dissipation using the cover 502, components that use more power may be used in the design of the computing device 100. The increased thermal dissipation may enable the computing device 100 to support computational components that consume more power (e.g., thereby generating more heat), such as a CPU with more cores, a CPU with a faster clock speed, a more powerful (e.g., more pipelines, faster clock speed, or the like) GPU, more memory, a faster memory, or any combination thereof.

The cover 502 may include one or more graphene layers to enable the cover to be used for cooling (e.g., thermal dissipation) and an electrical ground (e.g., signaling ground reference). For example, the cover 502 may include a conductive layer (e.g., a metal alloy, such as copper alloy) that is "sandwiched" between two layers of graphene. The graphene layers may be used as (i) a continuous reference plane for signal integrity and (ii) ground coupling for noise suppression. The graphene reference planes may be in contact with a thermal solution (e.g., vapor chamber) on either side to enable heat transfer between the two ends of the sheet.

Thus, the cover 502 having at least one graphene layer may be used as an external cover for the computing device 100. The cover may attach to an external surface of each housing. The cover may draw heat from a first (e.g., warmer) housing and spread and dissipate the heat to a second (e.g., cooler) housing. The cover may use a flexible, thermally conductive material, such as graphene to enable the first housing to flex and be placed at different angles relative to the second housing. The cover may have electrical characteristics that enable the cover to be used to provide power and a ground to the biometric sensor and clasp sensor (e.g., capacitive touch sensor, Hall-Effect sensor, or Reed switch) in the clasp. For example, a conductive layer of the cover may be comprised of a metal alloy (e.g., copper alloy) may be used to communicate signals while the graphene layer(s) of the cover may be used as an electrical ground for the signals. The signals may include data signals (e.g., including video data, audio data, files, and the like), power signals, and other electrical or electronic signals communicated in a computing device.

Figure 6:
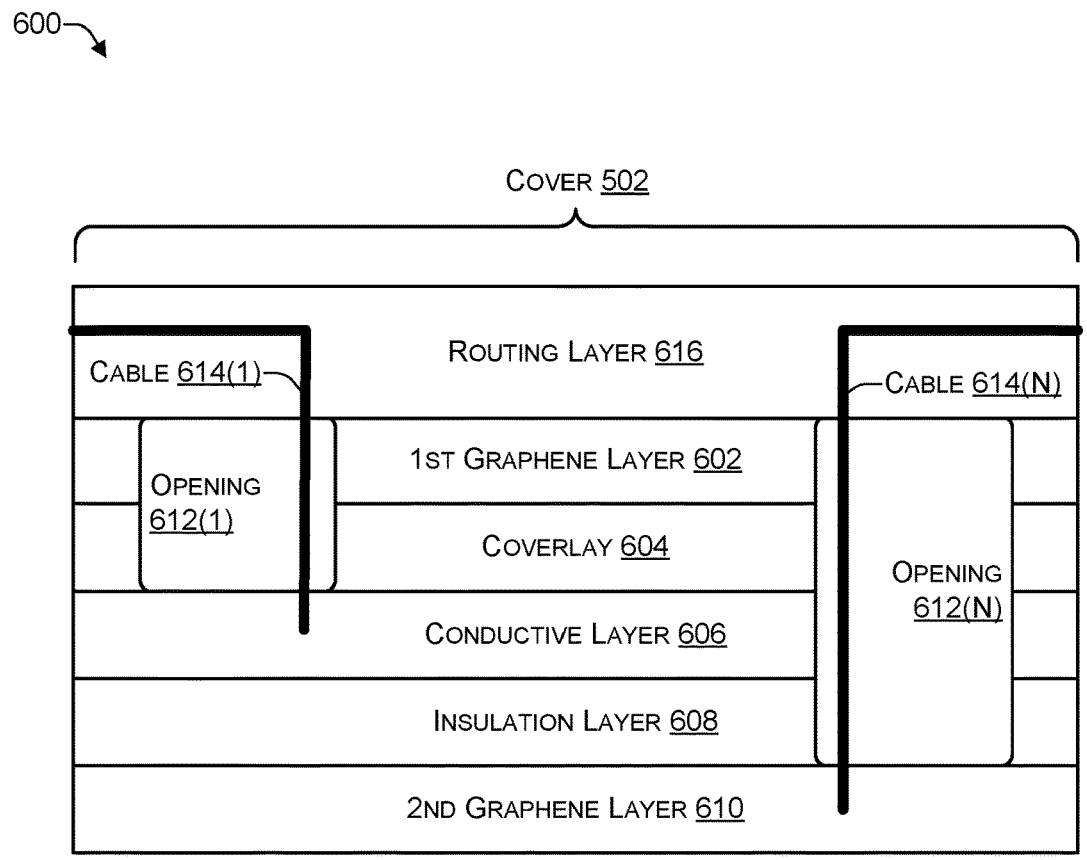
FIG. 6 is a block diagram illustrating layers of a thermally conductive sheet for use as a cover according to some embodiments.

FIG. 6 is a block diagram illustrating layers of a thermally conductive sheet for use as a cover according to some embodiments. For example, the cover 502 of FIG. 5 may include one or more layers, such as, for example, a first graphene layer 602, a coverlay 604, a conductive layer 606, an insulation layer 608, and a second graphene layer 610.

One of the graphene layers 602, 610 may be used for thermal conductivity (e.g., heat dissipation) while the other of the graphene layers 602, 610 may be used for electrical conductivity (e.g., signal ground). For example, the graphene layer 602 may be used for thermal conductivity while the graphene layer 610 may be used for electrical conductivity. Alternately, the graphene layer 610 may be used for thermal conductivity while the graphene layer 602 may be used for electrical conductivity. The coverlay 604 may be a film used to encapsulate and protect the inner layers 606, 608, 610. The coverlay 602 may be flexible to enable the coverlay 602 to withstand being bent back and forth when passing through a hinge. The conductive layer 606 may be used to transmit signals and may be comprised of a conductor, such as, for example, copper, silver, aluminum, gold, or another type of metal or metal alloy.

One or more openings 612, such as opening 612(1) to 612(N) (where N>1), may run vertically in the cover 502 to enable cables to be electrically connect to the conductive layer 606 and to whichever of the graphene layers 602, 610 is being used as an electrical ground. For example, a cable 614(1) may be routed through a shallow opening, such as the first representative opening 612(1), to enable the cable 614(1) to be connected to the conductive layer 606 (e.g., to transmit one or more signals or provide an electrical ground). A cable 614(N) may be routed through a deeper opening, such as the second representative opening 612(N), to enable the cable 614(N) to be connected to the second graphene layer 610 (e.g., to transmit one or more signals or provide an electrical ground).

The openings 612 may be used to connect cables (e.g., wires) in multiple locations, and an additional layer may be added for cable routing. For example, a routing layer 616 that sits on top of the first graphene layer 602 may be used to route and hold in place the cables 616(1) to 616(N) in the computing device 100. For example, the routing layer 616 may be used to route one or more of the cables 614 to the biometric sensor 158 and the clasp sensor 160 (e.g., capacitive touch sensor, Hall-Effect sensor, or Reed switch).

Figure 7:
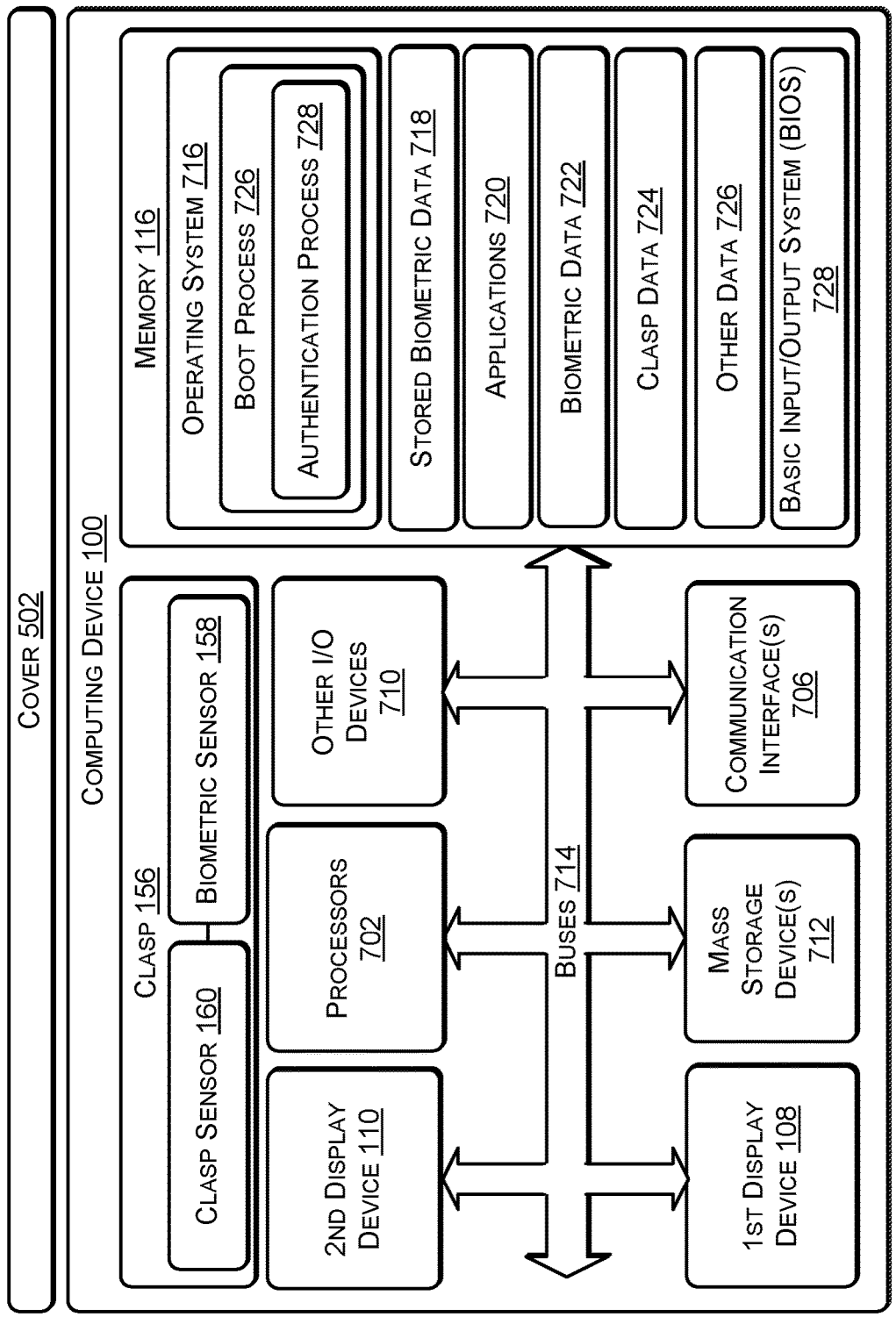
FIG. 7 illustrates an example configuration of a computing device that can be used to implement the systems and techniques described herein.

FIG. 7 illustrates an example configuration of the computing device 100 of FIG. 1 that can be used to implement the systems and techniques described herein. The computing device 100 may include one or more processors 702 (e.g., the CPU 112 and the GPU 114 of FIG. 1), the memory 116, communication interfaces 706 (e.g., including the I/O ports 120), the display devices 108, 110, other input/output (I/O) devices 710 (e.g., keyboard, trackball, and the like, such as the additional components 144), and one or more mass storage devices 712 (e.g., including the memory 116), configured to communicate with each other, such as via one or more system buses 714 (e.g., including the data bus 128, 130) or other suitable connections. While a single system bus is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may include the GPU 114 integrated into the CPU 112 or the GPU 114 may be a separate processor device from the CPU 112. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 116, mass storage devices 712, or other computer-readable media.

Memory 116 and mass storage devices 712 are examples of computer storage media (e.g., memory storage devices) for storing instructions that can be executed by the processors 702 to perform the various functions described herein. For example, memory 116 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 712 may be collectively referred to as memory or computer storage media herein, and may be any type of non-transitory media capable of storing computer-readable, processor-executable program instructions as computer program code that can be executed by the processors 702 as a particular machine configured for carrying out the operations and functions described in the implementations herein.

The computing device 100 may also include one or more communication interfaces 706 for exchanging data via a network. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display devices 108, 110 may be located in the housings 102, 104, respectively, and may be connected using one or more hinges (e.g., the hinges 106 of FIG. 1). The hinges may enable each of the display devices 108, 110 to be placed at an angle relative to the other display device. For example, the display devices 108, 110 may be used for displaying information and images to users. Other I/O devices 710 may be devices that receive various inputs from a user and provide various outputs to the user, and may include a keyboard, a touchpad, a mouse, a printer, audio input/output devices, and so forth.

The computer storage media, such as memory 116 and mass storage devices 712, may be used to store software and data. For example, the computer storage media may be used to store an operating system 716, stored biometric data 718 (e.g., associated with authorized users of the computing device 100), one or more software applications 720, biometric data 722 (e.g., acquired using the biometric sensor 158), clasp data 724 (sent by the clasp sensor 160), other data 726, and a basic input/output system (BIOS) 728. In many cases, the BIOS 728 may be stored in a read only memory (ROM) portion of the memory 116. The operating system 716 may include a boot process 726 that includes an authentication process 728. For example, the boot process 726 may be used to boot up the operating system 716. As part of the boot process 726, the authentication process 728 may attempt to authenticate the user of the computing device 100.

For example, a user may touch the clasp 160 (e.g., in the case of a capacitive touch sensor) for at least a predetermined amount of time or unlock/open the clasp 156 (e.g., in the case of a Hall-effect sensor or a Reed switch), thereby causing the clasp sensor 160 to initiate the boot process 726. In response to the clasp sensor 160 indicating that the user is in the process of opening/unlocking the clasp 156, the BIOS 728, may receive clasp data 724 from the clasp sensor 160 (e.g., capacitive touch sensor, Hall-Effect sensor, or Reed switch). The clasp data 724 may indicate that user is touching (or has touched) the clasp 156. The Hall-Effect sensor and Reed switch may send the clasp data 724 when a user moves the clasp 156 from a closed/locked position to an open/unlocked position. Because opening/unlocking the clasp 156 involves touching the clasp 156, the clasp data 724 sent by the clasp sensor 160 indicates that a user touched the clasp 156. In response to receiving the clasp data 724, the BIOS 728 may initiate the boot process 726. The authentication process 728 of the boot process 726 may attempt to authenticate the user by using the biometric sensor 158 (e.g., fingerprint reader, retina scanner, facial scanner, or the like) to gather the biometric data 722 and comparing the biometric data 722 with the stored biometric data 718. If the authentication process 728 determines that the biometric data 722 matches (e.g., within a predetermined amount or percentage) the stored biometric data 718, then the user may be granted access to the operating system 716. The term match means that the biometric data 722 may match a significant portion but not necessarily all of the stored biometric data 718. For example, for a biometric match, the user may be authenticated if the biometric data 722 matches at least N of M data points (M>N>0) or X% (e.g., N/M×100) of the stored biometric data 718. If the authentication process 728 determines that the biometric data 722 does not match (e.g., differs by more than a predetermined amount or percentage) the stored biometric data 718, then the user may be denied access to the operating system 716. If the user is denied access, then the authentication process 728 may request that the user supply (1) another sample of the same type of biometric data that was gathered, (2) a different type of biometric data, or (3) a username and password or other authentication means. To illustrate, for (1), if a fingerprint was not a match, the user may be asked to provide the same finger or a different finger for scanning. For example, the user may not have pressed the finger down correctly or the finger may have been dirty and the user may be asked to clean the finger and hold the finger steady over the biometric sensor 158 to obtain more accurate biometric data 722. For (2), if a fingerprint was not a match, the user may be asked to provide a retinal scan or use facial recognition to authenticate the user. For example, the user may be in the midst of eating lunch and the user's fingers may have food particles on them that render getting a good quality fingerprint difficult. In such cases, the user may opt for a retinal scan or a facial recognition instead of a fingerprint scan. For (3), if the authentication process 728 fails using the biometric data 722, then the authentication process 728 may use a different (e.g., non-biometric) authentication process such as a username and password, swipe of a near field communication (NFC) security fob, or the like.

Thus, the clasp 156 may include the biometric sensor 158 (e.g., fingerprint reader, retinal scanner, facial recognition sensor, or the like) to authenticate a user of the computing device 100. The clasp 156 may be physically used to secure the two housings 102, 104 (of FIG. 1) of the computing device 100. In addition to the biometric sensor 158, the clasp 156 may include the clasp sensor 160 (e.g., capacitive touch sensor, Hall-Effect sensor, Reed switch, or the like). When the BIOS 728 of the computing device 100 receives the clasp data 724 indicating that the clasp sensor 160 detected that a user opened/unlocked the clasp 156 or touched (or is touching) the clasp 156, the BIOS 728 may initiate the boot process 726 of the operating system 716 stored in the memory 116. In some cases, the boot process 726 may be initiated after the user touches the capacitive touch sensor in the clasp 156 for at least a predetermined amount of time (e.g., P milliseconds, where P>0). This may be done to prevent the computing device 100 from accidentally booting up when a user's hand or arm touches the capacitive touch sensor in the clasp 156. The predetermined amount of time may be sufficient to distinguish the user deliberately touching the capacitive touch sensor in the clasp 156 to initiate the boot process 726 from the user briefly and accidentally touching the capacitive touch sensor in the clasp 156. The boot process 726 may include the authentication process 728 that is used to authenticate the user. The authentication process 728 may use the biometric sensor 158 embedded in the clasp 156 to authenticate the user.

For example, the boot process 726 may authenticate the user by scanning a fingerprint (e.g., the biometric data 722) of a pad of a finger that is being pressed against the biometric sensor 158 (e.g., fingerprint scanner) and comparing the fingerprint with previously stored fingerprints (e.g., the stored biometric data 718) of one or more authorized users of the computing device 100. If the fingerprint matches one of the previously stored fingerprints, then the boot process 726 may continue booting until the operating system 716 has booted and the computing device 100 has been placed in an operational state. As another example, the boot process 716 may authenticate the user by scanning a retina of the user as the user gazes at the biometric sensor 158 (e.g., retinal scanner) and comparing the retinal scan (e.g., biometric data 722) with previously stored retinal scans (e.g., the stored biometric data 718) of one or more authorized users of the computing device 100. If the retinal scan matches one of the previously stored retinal scans, then the boot process 726 may continue booting until the operating system 716 has booted and the computing device 100 has been placed in an operational state. As yet another example, the boot process 726 may authenticate the user by capturing an image of the user's face as the user faces the biometric sensor 158 (e.g., an imaging sensor, such as a camera) and performing facial recognition by comparing the scanned facial features with previously stored facials scans of one or more authorized users of the computing device 100. If the scan of the user's face (e.g., the biometric data 722) matches one of the previously stored facial scans (e.g., the stored biometric data 718), then the boot process 726 may continue booting until the operating system 716 has booted and the computing device 100 has been placed in an operational state. Of course, other biometric sensors may be used to gather the biometric data 722 and compare the biometric data 722 with the stored biometric data 718 in a similar manner.

While the computing device 100 is booting, the user may open the two housings 102, 104 of the computing device 100, place the computing device 100 in a particular orientation, activate an active stylus used to provide input, and prepare to use the computing device 100. In this way, the time period from when the user touches the clasp 156 to the time the computing device is booted up and operational may be reduced because touching the clasp 156 initiates the boot process 726 instead of starting after the user undoes the clasp 156, opens the two housings, and selects a key to power-on the computing device 100.

The cover 502 may be in contact with the housings 102, 104 of FIG. 1. The cover 502 may conduct heat from heat generating components (e.g., CPU 112, GPU 114, or memory 116), to a second housing, where the heat is more easily dissipated because components in the second housing may generate less heat than the housing with the primary heat generating components. Thus, in a computing device with two housings, the cover 502 may span both the first housing and the second housing and may draw heat from one housing and dissipate the heat in another housing. The cover 502 may include one or more layers of a thermally and electrically conductive material, such as graphite/graphene to provide thermal cooling and an electrical ground. In addition, the cover 502 may include an electrically conductive layer that includes a metal alloy comprising copper, aluminum, another type of material, or any combination thereof. The electrically conductive layer may be used to communicate signals between different components of the computing device 100. The cover 502 may be made of a flexible material, such as graphene, enabling a single graphene sheet to be used for both housings. The cover 502 may be threaded through conduits in the hinges. By using the cover 502 that spans both housings, the temperature difference between the two housings of the computing device 100 may be reduced to less than a pre-determined threshold (e.g., preferably less than 6 degrees Fahrenheit and more preferably less than 4 degrees Fahrenheit). The increased thermal dissipation provided by the cover 502 may enable the computing device 100 to support components that consume more power (e.g., thereby generating more heat). For example, the cover 502 may enable the computing device 100 to support the CPU 112 with more cores and/or a faster clock speed, a more powerful (e.g., more pipelines, faster clock speed, or the like) GPU 114, more memory 116, a faster memory 116, or any combination thereof. The cover 502 may use one or more graphene layers to provide an electrical ground in addition to thermal conductivity. Graphene (or a graphene composite such as doped graphene) may be used as both a thermal solution and a signaling ground reference, thereby reducing the thickness of computing devices. Signals may be "sandwiched" between two layers of graphene to provide a continuous reference plane (for signal integrity) and ground coupling (for noise suppression). The graphene also provides a thermal solution to enable heat transfer between the two housings to which the cover 502 is attached. Using graphene may provide several benefits, including reducing duplicate layers of plastic (e.g., polyethylene terephthalate or similar) material, providing a contiguous (e.g., uninterrupted) surface for thermal spreading, and enabling one or more layers for cable routing to be added to route cables to the clasp sensor 160 (e.g., capacitive touch sensor, Hall-Effect sensor, or Reed switch) and biometric sensor 158 in the clasp 156.

Figure 8:
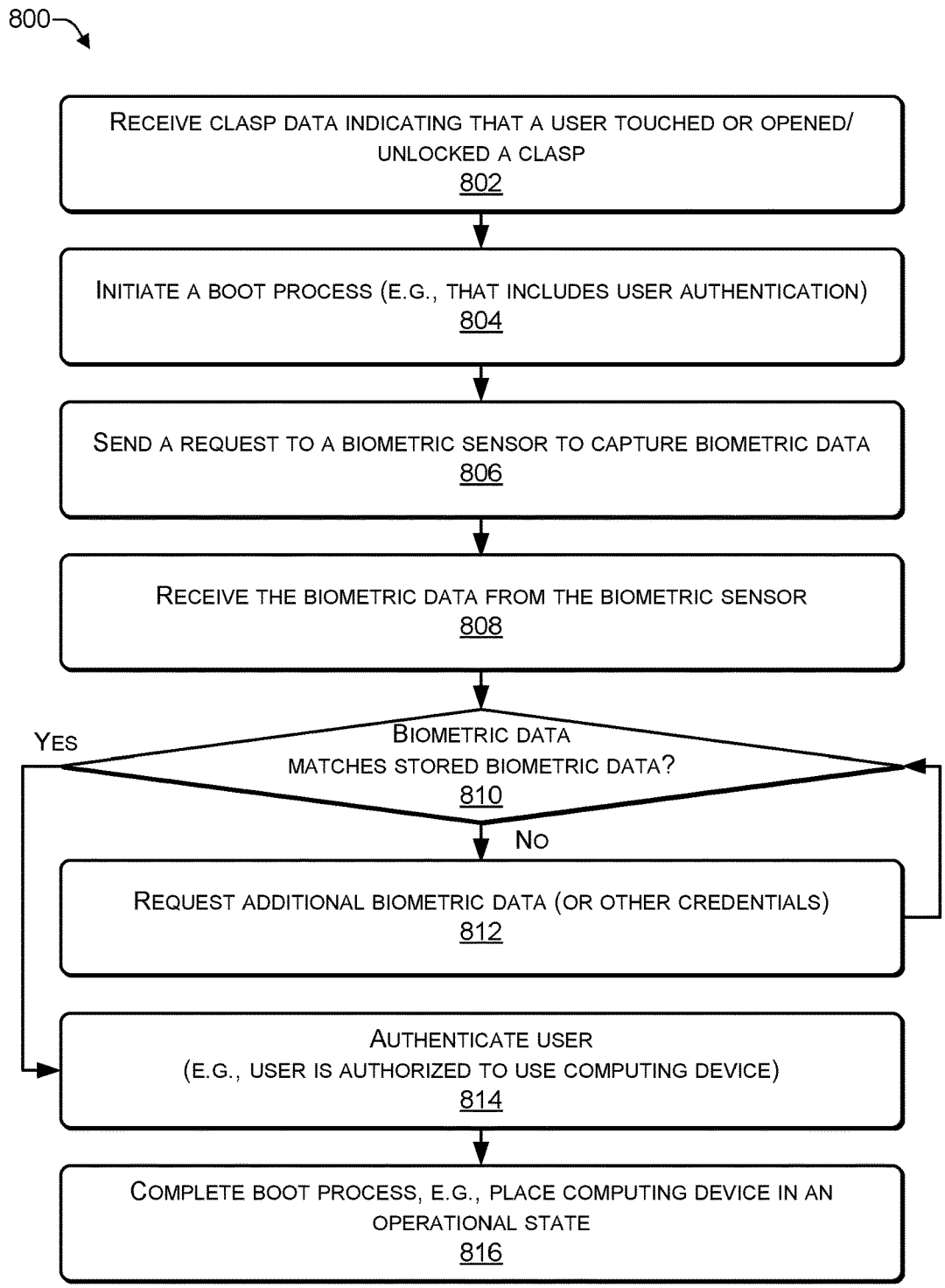
FIG. 8 is a flowchart of a process to authenticate a user according to some embodiments.

In the flow diagram of FIG. 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 800 is described with reference to FIGS. 1, 2, 3, 4, 5, 6, and 7 as described above, although other models, frameworks, systems and environments may be used to implement this process.

FIG. 8 is a flowchart of a process 800 to authenticate a user according to some embodiments. The process 800 may be performed by one or more components of a computing device, such as the computing device 100 described herein.

At 802, clasp data indicating that a user touched (or is currently touching) a capacitive touch sensor may be received (e.g., from a capacitive touch sensor) or that a user moved the clasp from a closed/locked position to an open/unlocked position (e.g., from a Hall-Effect sensor, Reed switch, or the like). At 804, a boot process may be initiated. For example, in FIG. 7, the BIOS 728 of the computing device 100 may receive the clasp data 724 indicating that the clasp sensor 160 (e.g., capacitive touch sensor, Hall-Effect sensor, or Reed switch) detected that a user touched (or is currently touching) the clasp 156. In response, the BIOS 728 may initiate the boot process 726 of the operating system 716 stored in the memory 116.

At 806, a request may be sent to a biometric sensor to capture biometric data (e.g., fingerprint scan, retinal scan, facial scan, or the like). At 808, the biometric data may be received from the biometric sensor. For example, in FIG. 7, the boot process 726 may instruct the biometric sensor 158 to capture the biometric data 722. In response, the biometric sensor 158 may send the biometric data 722 to the authentication process 728. For example, if the biometric sensor 158 is a fingerprint scanner, then the biometric data 722 may be a scan of a fingerprint (or thumbprint) of the pad of a finger (or thumb) that the user is pressing against the biometric sensor 158. If the biometric sensor 158 is a retinal scanner, then the biometric data 722 may be a scan of a retina of an eye of the user that is in the field of view of the biometric sensor 158. If the biometric sensor 158 is a facial scanner, then the biometric data 722 may be a scan of the user's face that is in the field of view of the biometric sensor 158.

At 810, an attempt may be made to authenticate the user by determining whether biometric data matches stored biometric data (e.g., associated with user authorized to operate the computing device). If a determination is made, at 810, that "no" the biometric data does not match the stored biometric data, then the process may proceed to 812, where additional biometric data (or another type of credentials, such as a username and password) may be requested. The process may proceed to 810 where a determination may be made whether the additional biometric data matches the stored biometric data. The process may repeat 810 and 812 a predetermined number of times. If, after the predetermined number of times the user has not been authenticated, a message may be displayed indicating that user authentication failed and that access to the computing device is denied. If a determination is made, at 810, that "yes" the biometric data matches the stored biometric data, then the process may proceed to 814, whether the user is authenticated. At 816, the boot process is completed, thereby placing the computing device in an operational state. For example, in FIG. 7, the boot process 726 may compare the biometric data 722 (e.g., fingerprint scan, retinal scan, facial scan, or the like) with the previously stored biometric data 718 (e.g., previously stored fingerprints, retinal scans, facial scans, or the like) associated with at least one authorized users of the computing device 100. If the biometric data 722 matches the previously stored biometric data 718, then the boot process 726 may continue until the operating system 716 has completed booted (e.g., placing the computing device 100 in an operational state). The term match means that the biometric data 722 may match a significant portion but not necessarily all of the stored biometric data 718 that is associated with a particular user. For example, for a biometric match, the user may be authenticated if the biometric data 722 matches at least N of M data points (M>N>0) or X% (e.g., N/M×100) of the stored biometric data 718. If the authentication process 728 determines that the biometric data 722 does not match (e.g., differs by more than a predetermined amount or percentage) the stored biometric data 718, then the user may be denied access to the operating system 716. In some cases, if the user is denied access, then the authentication process 728 may request that the user supply (1) another sample of the same type of biometric data that was gathered, (2) a different type of biometric data, or (3) a username and password or other authentication means. To illustrate, if the biometric data 722, such as a fingerprint scan, is not a match, then additional biometric data may be gathered by asking the user to provide the same finger (or a different finger) for a subsequent fingerprint scan. For example, the user may have pressed the finger down incorrectly or the finger may have dirt/debris. In such circumstances, the user may be asked to clean the same finger (or a different finger) and hold the finger steady over the biometric sensor 158 for a predetermined amount of time to obtain more accurate biometric data. In some cases, if a fingerprint is not a match, the user may be asked to provide a retinal scan or use facial recognition to authenticate the user. For example, the user may be in the midst of eating lunch and the user's fingers may have food particles on them that render getting a good quality fingerprint difficult. In such cases, the user may opt for a retinal scan or for authentication using facial recognition instead of a fingerprint scan. In some cases, if the authentication process 728 fails using the biometric data 722, then the authentication process 728 may use a different (e.g., non-biometric) authentication process such as a username and password, swipe of a near field communication (NFC) security fob, or the like. The authentication process 728 may perform a predetermined number of attempts to authenticate the user. If the predetermined number of attempts are unsuccessful in authenticating the user, then the user may be denied access to the computing device 100.

Thus, when a clasp is used to hold two housings of a computing device, such as a laptop or a dual-display tablet, a clasp sensor (e.g., capacitive touch sensor, Hall-Effect sensor, or Reed switch) and a biometric sensor may be embedded into the clasp. The BIOS of the computing device may detect when a user touches the clasp for at least a predetermined period of time or opens/unlocks the clasp and initiate a boot process of the operating system. The predetermined amount of time may be sufficient to distinguish the user deliberately touching the clasp to initiate the boot process from the user briefly and accidentally touching the clasp. The clasp may be made of a metal or a metal alloy to enable a capacitive touch sensor to detect when a user is touching the clasp. The clasp may include a Hall-Effect sensor or Reed switch to detect when the user has opened/unlocked the clasp. The boot process may use the biometric sensor to authenticate the user by gathering biometric data using the biometric sensor and comparing the biometric data to stored biometric data associated with one or more authorized users. In this way, the user can touch the clasp to initiate the boot process and while the operating system of the computing device is booting, the user can move the clasp from a closed (or locked) position to an open (or unlocked position), position the first housing at an angle that is greater than zero relative to the second housing, locate a stylus, and perform other actions to prepare to use the computing device. By the time the user has completed preparing to use the computing device, the computing device may become operational within a few seconds, thereby improving the user's experience by reducing the amount of time the user has to wait to use the computing device after touching the clasp.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
a first housing comprising:
a first display device;
one or more processors; and
one or more non-transitory storage media to store instructions executable by the one or more processors;
a second housing comprising:
a second display device;
one or more hinges coupling the first housing to the second housing, wherein the one or more hinges enable the first housing to be placed at an angle relative to the second housing; and
a clasp to temporarily attach the first housing to the second housing when the first housing is placed at an angle of about 0 degrees relative to the second housing, wherein the clasp comprises:
a biometric sensor; and
a clasp sensor;
wherein the instructions are executable by the one or more processors to perform operations comprising:
receiving clasp data from the clasp sensor, the clasp data indicating that a user has touched the clasp;
based at least in part on receiving the clasp data from the clasp sensor, transitioning the computing device from a low-power state to an operational state;
initiating a boot process of an operating system; and
authenticating the user using the biometric sensor.

2. The computing device of claim 1, wherein:
the biometric sensor comprises a fingerprint reader; and
authenticating the user using the biometric sensor comprises authenticating a fingerprint of the user using the fingerprint reader.

3. The computing device of claim 1, wherein:
the biometric sensor comprises a retinal scanner; and
authenticating the user using the biometric sensor comprises authenticating a retinal scan of the user using the retinal scanner.

4. The computing device of claim 1, wherein:
the biometric sensor comprises an imaging sensor; and
authenticating the user using the biometric sensor comprises performing facial recognition using the imaging sensor.

5. The computing device of claim 1 wherein:
the clasp sensor comprises one of a capacitive touch sensor, a Hall-Effect sensor, or a Reed switch.

6. The computing device of claim 1, wherein authenticating the user using the biometric sensor comprises:
capturing biometric data using the biometric sensor; and
determining that the biometric data matches previously stored biometric data.

7. The computing device of claim 1, wherein authenticating the user using the biometric sensor comprises:
capturing biometric data using the biometric sensor;
determining that the biometric data does not match previously stored biometric data;
capturing additional biometric data using the biometric sensor; and
determining that the additional biometric data matches the previously stored biometric data.

8. A computing device comprising:
a first housing comprising:
a first display device;
one or more processors; and
one or more non-transitory storage media to store instructions executable by the one or more processors;
a second housing comprising:
a second display device;
one or more hinges coupling the first housing to the second housing, wherein the one or more hinges enable the first housing to be placed at an angle relative to the second housing; and
a cover attached to the first housing and to the second housing, the cover comprising:
a clasp to attach the first housing to the second housing when the first housing is placed at an angle of about 0 degrees relative to the second housing, wherein the clasp comprises:
a biometric sensor; and
a clasp sensor;
a graphene layer to dissipate heat generated by the first housing and the second housing; and
a routing layer that is used to route one or more cables to the biometric sensor and to a capacitive touch sensor;
wherein the instructions are executable by the one or more processors to perform operations comprising:
receiving clasp data from the clasp sensor, the clasp data indicating that a user has touched the clasp;
based at least in part on receiving the clasp data from the clasp sensor, transitioning the computing device from a low-power state to an operational state;
initiating a boot process of an operating system; and
authenticating the user using the biometric sensor.

9. The computing device of claim 8, wherein:
the one or more cables to the biometric sensor and to the capacitive touch sensor carry at least one of:
sensor data or power.

10. The computing device of claim 8, wherein the first housing further comprises:
one or more processors; and
one or more non-transitory storage media to store instructions executable by the one or more processors to perform operations comprising:
receiving clasp data indicating that a user touched the clasp;
initiating a boot process of an operating system;
capturing biometric data using the biometric sensor; and
authenticating the user based at least in part on determining that the biometric data matches previously stored biometric data.

11. The computing device of claim 8, wherein the biometric sensor comprises a fingerprint reader.

12. The computing device of claim 8, wherein the biometric sensor comprises a retinal scanner.

13. The computing device of claim 8, wherein the biometric sensor comprises an imaging sensor used to perform facial recognition.

14. A computing device comprising:
a first housing comprising:
a display device;
a second housing comprising:
one or more processors; and
a memory to store instructions executable by the one or more processors;
one or more hinges coupling the first housing to the second housing, wherein the one or more hinges enable the first housing to be placed at an angle relative to the second housing; and
a clasp to temporarily attach the first housing to the second housing when the first housing is placed at an angle of about 0 degrees relative to the second housing, wherein the clasp comprises:
a biometric sensor; and
a clasp sensor;
wherein the instructions are executable by the one or more processors to perform operations comprising:
receiving clasp data from the clasp sensor, the clasp data indicating that a user has touched the clasp;
based at least in part on receiving the clasp data from the clasp sensor, transitioning the computing device from a low-power state to an operational state;
initiating a boot process of an operating system; and
authenticating the user using the biometric sensor.

15. The computing device of claim 14, wherein the biometric sensor comprises a fingerprint reader to scan a fingerprint or a thumbprint.

16. The computing device of claim 14, wherein the biometric sensor comprises a retinal scanner to scan a retina.

17. The computing device of claim 14, wherein the biometric sensor comprises an imaging sensor to perform facial recognition.

18. The computing device of claim 14, wherein:
the clasp sensor comprises one of a capacitive touch sensor, a Hall-Effect sensor, or a Reed switch.

19. The computing device of claim 18, wherein authenticating the user using the biometric sensor comprises:
capturing biometric data using the biometric sensor; and
determining that the biometric data matches previously stored biometric data.

20. The computing device of claim 18, wherein authenticating the user using the biometric sensor comprises:
determining that biometric data captured by the biometric sensor does not match previously stored biometric data;
capturing additional biometric data using the biometric sensor; and
determining that the additional biometric data matches the previously stored biometric data.

* * * * *